United States Patent [19]

Croft et al.

[11] Patent Number: 5,701,329
[45] Date of Patent: Dec. 23, 1997

[54] STANDBY POWER SAVINGS WITH CUMULATIVE PARTY CHECK IN MOBILE PHONES

[75] Inventors: Thomas Milton Croft, Cary, N.C.; Paul Wilkinson Dent, Stehag, Sweden; Lawrence J. Harte, Cary, N.C.; Torbjorn Solve, Lund, Sweden

[73] Assignee: Ericsson Inc., Research Triangle Park, N.C.

[21] Appl. No.: 729,718

[22] Filed: Oct. 7, 1996

Related U.S. Application Data

[63] Continuation of Ser. No. 59,932, May 11, 1993, Pat. No. 5,568,513.

[51] Int. Cl.⁶ .................................................. H04B 3/46
[52] U.S. Cl. ...................... 375/224; 455/343; 455/38.3
[58] Field of Search .......................... 455/343, 38.3; 375/224; 340/825.44; 371/5.5

[56] References Cited

U.S. PATENT DOCUMENTS

| | | | |
|---|---|---|---|
| 3,694,755 | 9/1972 | Ward | 455/38.3 |
| 4,370,753 | 1/1983 | Ehmke | 455/38.3 |
| 4,518,947 | 5/1985 | Poston et al. | 341/81 |
| 4,631,496 | 12/1986 | Borras et al. | 331/1 A |
| 4,654,867 | 3/1987 | Labedz et al. | 379/59 |
| 4,903,335 | 2/1990 | Shimizu | 455/343 |
| 4,905,234 | 2/1990 | Childress et al. | 370/349 |
| 4,996,526 | 2/1991 | DeLuca | 340/825.44 |
| 5,025,251 | 6/1991 | Mittel et al. | 340/825.44 |
| 5,027,428 | 6/1991 | Ishiguro et al. | 455/38.3 |
| 5,058,203 | 10/1991 | Inagami | 455/89 |
| 5,072,449 | 12/1991 | Enns et al. | 371/37.1 |
| 5,103,192 | 4/1992 | Sekine et al. | 331/1 A |
| 5,109,530 | 4/1992 | Stengel | 455/38.3 |
| 5,123,014 | 6/1992 | Federkins et al. | 370/522 |
| 5,140,698 | 8/1992 | Toko | 457/76 |
| 5,144,296 | 9/1992 | Deluca et al. | 340/825.44 |
| 5,175,870 | 12/1992 | Mabey et al. | 455/67.1 |
| 5,175,874 | 12/1992 | Auchter | 455/343 |
| 5,179,724 | 1/1993 | Lindoff | 455/76 |
| 5,224,152 | 6/1993 | Harte | 455/343 |
| 5,251,325 | 10/1993 | Davis et al. | 455/38.3 |
| 5,265,270 | 11/1993 | Stengel et al. | 455/343 |
| 5,369,798 | 11/1994 | Lee | 455/33.1 |
| 5,406,613 | 4/1995 | Peponides et al. | 379/58 |
| 5,471,655 | 11/1995 | Kivari | 455/127 |

FOREIGN PATENT DOCUMENTS

| | | |
|---|---|---|
| 0 473 465 | 3/1992 | European Pat. Off. |
| 62-023266 | 1/1987 | Japan. |

*Primary Examiner*—Stephen Chin
*Assistant Examiner*—Kevin Kim
*Attorney, Agent, or Firm*—Burns, Doane, Swecker & Mathis, L.L.P.

[57] ABSTRACT

A power saving standby mode that can be used in mobile radio stations operating in current networks and improves in the intended message reception. The invention enters the power down mode principally contingent upon the CRC check being successful. Additionally, the invention uses a cumulative majority vote procedure which results in a higher probability of correct reception of a message addressed to the receiving station.

12 Claims, 5 Drawing Sheets

STANDBY POWER SAVINGS WITH CUMULATIVE PARTY CHECK IN MOBILE PHONES

This application is a continuation of application Ser. No. 08/059,932, filed May 11, 1993, now U.S. Pat. No. 5,568,513.

BACKGROUND OF THE INVENTION

1. Field of the Invention

This invention relates to a method of and apparatus for reducing power consumption of portable radio communication systems, such as mobile telephones, in standby mode to increase the time between necessary battery charges and recharges.

2. Discussion of Related Art

Cellular mobile telephone systems comprise a network of base stations, each covering a particular geographical area or cell, that communicate with the plurality of mobile or hand-portable phones (hereinafter "mobile phones"). Such system contain means to ensure as far as possible that the nearest base station is used to communicate with each mobile phone, thus minimizing the transmitter power needed in the mobile phone.

When a mobile phone is in a standby mode, i.e., when it is neither originating nor receiving a call, it must listen to the nearest base station for calls. Not all of the receiver section need be operative in this standby mode and none of the transmitter section need be operative for the mobile phone does not transmit in the standby mode. This results in longer battery life, typically around eight hours as compared to the one or two hours of battery life when the mobile phone is in active conversation and both the transmitter and receiver operate.

The demand to obtain ever longer battery operating life is clear. European Patent No. EP 0 473 465 to Harte describes a method of reducing standby current consumption. This method is based on calling channel transmission formats used by base stations in conformance with the British ETACS standard or to the U.S. EIA-553 cellular standard. In the latter system, 40-bit calling messages to mobile phones in the standby mode are transmitted by base stations in a format that includes five repeats of the 40-bit blocks. A calling message identifies a called mobile phone by including its telephone number, also known as the Mobile Identification Number (MIN), in the message. Each message also contains a cyclic redundancy check (CRC) code, whose value depends on the data bits, that can be used to verify the correct decoding and even to correct single bit errors in the message. Each 40-bit message consists of 28 data bits and 12 CRC bits. Because the MIN is 34 bits long, it tabs two such calling messages to identify the phone uniquely. 40-bit blocks conveyed at one time are renamed "control words" or just "words," and a calling message consists of two such words. Whenever any message consists of more than one word, a continuation bit is set in all words except the last to indicate that further words will follow.

In the aforementioned European patent, Harte proposes a phone that would decode each message repeat independently as it is received, carry out a check for correct decoding using the CRC, and if correct decoding is indicated by the CRC check, check whether the MIN of the receiving mobile phone is contained in the received word. If the MIN is not in the received word, as is the case for the vast majority of messages, then the mobile phone powers down until the next set of five message repeats is due, according to the European patent. Thus, according to the European patent, the mobile phone could enter a reduced power mode for the remaining four message repeats whenever the first of the repeats is deemed not to contain the mobile's MIN, representing a potential savings of at least 80% of the battery energy consumed in the standby mode. Additionally, when the mobile phone has already identified from the first of the two control words of a message that the MIN does not match that of the receiving mobile phone, the mobile phone does not need to process the second word, and can power down for all five repeats of the second word. TMs results in a potential power savings of 90% in the standby mode.

On the other hand, a disadvantage of the device disclosed in the European patent is that when a message is intended for the mobile phone, the probability of detecting the message correctly is reduced if the mobile phone is at maximum range, such as on the periphery of a cell where signal levels are likely lowest. The reason for this is that the method of decoding used in the disclosed system requires three out of the five message repeats to be correctly decoded. The power savings method results in a lower probability of decoding the intended message by using just one decoded message out of the five repeated messages. In fact, the method disclosed in the European patent reduces the probability of decoding an intended message accurately below that of mobile phones not implementing the method. Thus, a trade-off between the intended message reception reliability and power consumption in the standby mode is made when using the method disclosed in the European patent.

A reason for the reduced performance is that the five-message repeat structure transmitted according to the U.S. EIA-553 cellular standard is not optimally designed for decoding in the manner disclosed in the aforementioned European patent. The normal method of decoding messages in a U.S. EIA-553 cellular system requires reception of all five message repeats in order to implement bit-wig majority vote decoding, and thus the scope for implementing the power saving method disclosed in the European patent is not clear.

When using redundant coding such as repeat coding with majority vote decoding, it is desirable to space repeat bits as far as apart as possible in time so that they are subject to uncorrelated fading. This known as bit interleaving. The furthest apart each repeat can be theoretically placed by a bit-interleaver is the length of one complete message. Therefore, maximally bit-interleaved repeat coding results in a transmission that appears to be five repeats of the message in succession. However, the optimum decoding is not to decode each message repeat independently, as used in the prior art, but to decode each bit by means of a 5-fold majority vote process before performing CRC checking on the majority-decoded bits.

Therefore, the five message repeats sent in accordance with the EIA-553 standard should in fact be regarded as five repeats of each bit, a 5-fold majority vote being employed to decode each bit before attempting to perform the CRC cheek on each 40-bit word of the message. However, this requires that all five word-repeats be received, which conflicts with the basic method disclosed in the European patent for reducing power consumption.

SUMMARY OF THE INVENTION

The present invention provides an improved, power saving standby mode that can be used in mobile phones opening in current networks such as the American Mobile Phone System (AMPS) EIA-553 in the U.S., NMT in Scandinavia and ETACS in the U.K., and which does not result in a reduction of the probability of correctly receiving the intended message, but indeed improves in the intended message reception.

The present invention provides, in a radio communications system having at least one base station serving one or more portable stations, a method to reduce standby power consumption of portable stations. This method includes the step of transmitting messages from a base station, each message including a number of words and each word being repeated a number of times, at least one word including a number of data bits representing at least part of a identification number of any of the portable stations and including a number of check bits that depend on the data bits. Upon detection of a message, the portable station resets a number of accumulators corresponding to the number of data bits and check bits and, upon receiving a first of the repeated words at the portable station, adds the values of each bit to a corresponding one of the accumulators. The inventive method further includes processing the values of the accumulator contents to determine if values corresponding to the data bits are consistent with values corresponding to the check bits and generating a check or no-check indication, and, if the no-check indication is generated, receiving another repeat of the word and adding its bit values to corresponding accumulators. The inventive method repeats the processing step until all word-repeats have been accumulated or until the check signal is generated. Upon generation of a check indication, the inventive method powers down parts of the portable station for the remainder of the repeats of the word and then further processes the accumulator values to determine if pan of the word matches a corresponding pan of the portable station's identification number and generating a match or no-match indication. Upon generation of a no-match indication, the inventive method holds parts of the portable station powered down for the duration of transmission of the rest of the words in the same message.

BRIEF DESCRIPTION OF THE DRAWINGS

The present invention will now be described with reference to the following drawing figures.

DETAILED DESCRIPTION OF THE PREFERRED EMBODIMENTS

Figure 1:
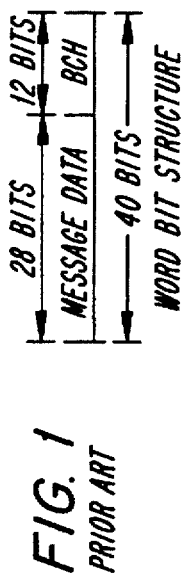
FIG. 1 shows the bit structure of a control word.
Figure 2:
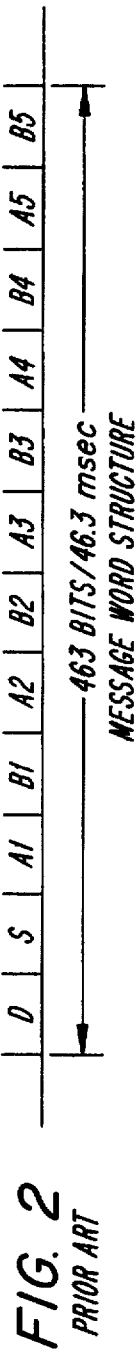
FIG. 2 shows the structure of a transmit cycle.

FIG. 1 shows the structure of one 40-bit control word comprising 28 message bits and 12 CRC bits according to the EIA-553 cellular standard. The CRC code, whose value depends on the data bits, provides powerful error detection capability and optionally the ability to correct any single-bit error in the 28-bit message in a manner described hereinafter. FIG. 2 shows the structure of one transmit cycle according to EIA-553. Each transmit cycle conveys five repeats A1, A2, ... A5 of a first 40-bit word "A" and five repeats B1, B2 ... B5 of a second 40-bit word "B". The A and B words belong to independent messages intended for mobile phones having odd and even MINs, respectively.

Figure 3:
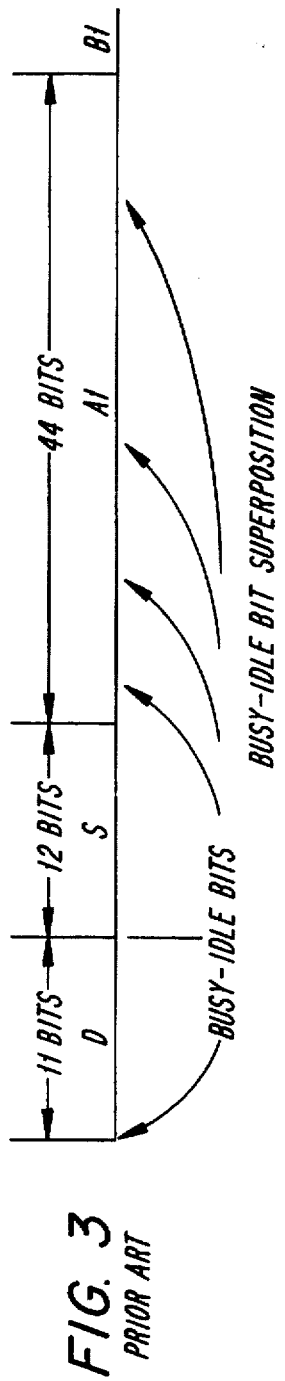
FIG. 3 shows the preamble bit-block D and S shown in FIG. 2.

FIG. 3 shows more detail of the preamble bit-blocks labeled D and S in FIG. 2. The "dotting sequence" D is a 10-bit block of alternating 1's and 0's intended to provide the receiver with symbol resynchronization opportunities. Symbols are transmitted using Manchester code, in which a "1" is represented by a signal upswing followed by a signal downswing and a "0" is reproduced by a downswing followed by an upswing. In the EIA-553 cellular standard, the bit rate is 10 kb/s. The alternating 1's and 0's after Manchester coding then appear as a 5 kilohertz tone. The Manchester coded bits are transmitted using frequency modulation of a radio carrier. Preceding the 10-bit dotting sequence is a single bit busy/idle flag, giving the total 11 bits labeled "D" in FIGS. 2 and 3.

Following the dotting sequence D is an 11-bit sync word also preceded by a busy/idle flag, making the 12 bits labeled "S" in FIGS. 2 and 3. Them then follow five repeats, each of two 40-bit calling messages designated A and B. Four extra busy/idle bits are inserted in each message repeat making 44-bit blocks, as shown in FIG. 3. The total number of bits in a calling channel cycle is thus 1+10+1+11+2x5x (40+4)=463 bits.

Figure 4:
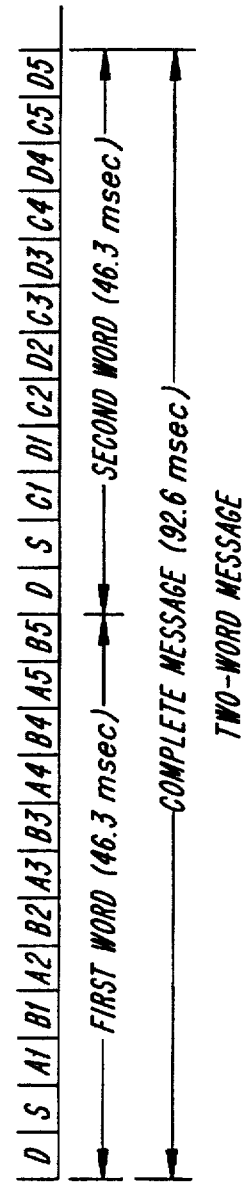
FIG. 4 shows the structure of two words containing the Mobile Identification Number (MIN)

In the event that a mobile station is called, it takes two 40-bit words to convey all 34 bits of its MIN. Thus, the first 24 bits of its MIN are sent in a first cycle and the remaining 10 bits of the MIN are sent in a second cycle, as shown in FIG. 4. The first word of the multiple word message contains a flag to indicate that continuation words are to be expected. Continuation words have a continuation flag set. The continuation flag appears in either the A or B word depending on whether the mobile has an odd or even MIN. A call can in some cases consist of more than two words and so it is necessary to look at the third word to determine if it is a continuation of an already begun message, or of a new message because, if it is determined that the first word does not contain the mobile's MIN and the continuation flag is set, then the second word does not need to be processed. If the second word is not processed, then the mobile does not know if the continuation flag is set in the second word, thus necessitating looking for a continuation flag in the third word. Other possible message types are dummy messages, or filler, which may be a single word that can be ignored, and a one- or multiple-word broadcast or "overhead" message that is to be processed by all mobile phones.

Figure 5:
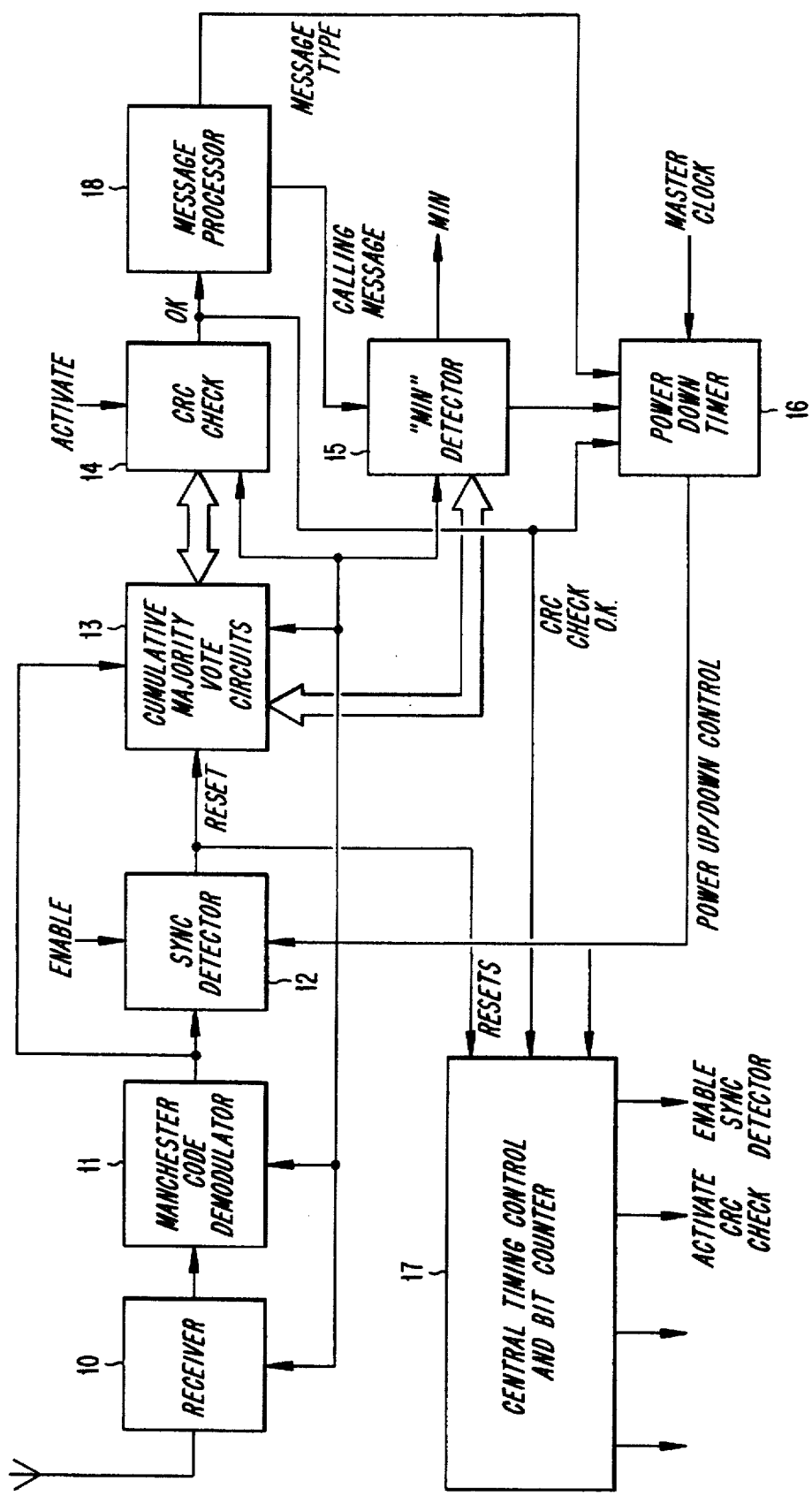
FIG. 5 is a block diagram of a mobile telephone receiver in accordance with the present invention.

FIG. 5 is a block diagram of a mobile telephone receiver according to the present invention for receiving and decoding messages transmitted in accordance with the formats shown in FIGS. 1-4. An antenna and receiver 10 receives, amplifies and filters signals received from a base station and down converts them to a suitable frequency for processing. A Manchester code modem 11 processes these signals to determine transmitted bit polarities and passes the processed bits to a sync detector 12. The Manchester code modem 11 and sync detector 12 can include a conventional frequency discriminator.

A cumulative majority vote circuit 13 provides cumulative majority vote decoding for each of the 40 bits in a received control message. Majority voting is normally defined for only odd numbers of repeats (3, 5, or more repeats) and it will be understood that the present invention can advantageously perform majority voting over even numbers of repeats also. Majority vote decoding over even numbers of repeats uses soft majority voting rather than hard majority voting in the preferred embodiment of the invention.

In hard majority voting, a data bit is represented by a number value of 1 or −1 corresponding to the Boolean values "0" and "1". Separate estimates of the repeated data bit may then be combined by numerical addition. For example, if a first estimate of a bit is +1, a second estimate is +1 and a third estimate is −1, their sum is 1+1−1=+1 to indicate that the majority vote result is +1. However, when combining an even number in a hard bit decision, an indeterminate value of 0 (e.g., 1+1−1−1=0) can occur. Nevertheless, hard majority voting can in principle still be employed for decoding even numbers of repeats; one would just have to arbitrarily assign one or the other bit polarity in cases where the outcome is indeterminate. The resulting bit error rate would be less than without majority vote. decoding, except in the case of a two-fold, hard majority vote which my be shown as follows.

In a situation where two estimates of each bit have the same probability of error in the mean but are otherwise uncorrelated, and this error probability is represented by "E", the probability that both estimates will be correct is thus $(1-E)\times(1-E)$. The majority vote makes a clear decision in this case. It also makes a clear wrong decision when both estimates are in error, which occurs with the probability of E×E. The probability that the two estimates disagree, given an indeterminate decision, is $2E(1-E)$. In half of these cases an arbitrary decision will be wrong and in the other half it will be right. Therefore, the total error probability is E×E+ $E(1-E)=E$. Therefore, a two-fold hard-decision majority vote gives the same error probability as no majority vote in this circumstance.

However, the errors do not necessarily occur in the same place, nor is the number of errors in any particular message exactly the same with and without the majority vote. Therefore, there is still a non-zero chance that a two-fold majority vote of two message repeats will be error free or error correctable when the first and second repeats contain errors. The probability of an error-free or error-correctable majority vote increases as higher order (meaning more repeats) majority voting is employed.

In soft majority voting, however, a bit is not just represented by the values 1 or −1 (for Boolean 0 and 1) but by continuous measure reflecting the confidence of the bit's polarity. For example, 0.9 represents a "0" with a high confidence, while 0.1 represents a "0" with a low confidence whereas −1.25 represents a "1" with a very high confidence while −0.05 represents a "1" with a very low confidence. By adding in the confidence values of the corresponding bits, a net or cumulative confidence value representing the polarity of the bit is obtained, this value being valid for even numbers of repeats as well as odd numbers of repeats. The chance of exactly 0 resulting from adding soft bit values is small, so that an arbitrary treatment of 0 as always being positive number (or alternatively a negative number) has no significant impact on the resulting error rates. Soft majority voting is therefore the preferred technique for implementing the present invention, although hard majority voting can be employed with somewhat less favorable results.

The invention therefore includes a majority vote accumulator for each bit of a control word. The 40 accumulators are indicated by block 13 in FIG. 5. Upon detecting a dotting sequence D followed by a sync word S, these 40 accumulators are reset to 0. Detecting the dotting sequence followed by the sync word S may, for example, be achieved reliably in the following way.

The last 16 bits from the Manchester code modem 11 are clocked into a shift register. The contents of the shift register are interpreted as a binary number between 0 and 65535. This binary numerical value is compared with a first value corresponding to the last 5 bits of the dotting sequence, a busy/idle bit equal to 0 and the 11 bit sync word S, and with the second value corresponding to a busy/idle bit having a value of 1. If either comparison yields a match, the sync word S and dotting sequence D are deemed to have been detected. It is alto possible to compare the last 6 bits of the dotting sequence D plus the first ten bits of the sync word S (including the unknown busy/idle bit) to obtain an advance sync indication, as well as allowing an imperfect match, for example by permitting any one bit to be in error in order to increase the probability of sync detection. Tradeoffs between detection probability and false alarm probability are appropriately balanced in designing the sync detector 12.

After sync detection has caused the value in the 40 cumulative majority vote circuits to be set to 0, the next 40-bit values out of the Manchester code demodulator excluding the 4 busy/idle bits are added to the corresponding majority-vote accumulators, so that they now simply contain the first repeat A1 of the A control word. If the phone has an odd MIN, a central timing/bit counting circuit 17 will cause the first 40 data bits and the 4 busy/idle bits to be discarded and the second 40 bits B1 added to the accmulators instead. At this point, a CRC check circuit 14 is activated by the central timing/bit counting unit 17 to process the contents of the majority vote circuits to decide if they contain a 40-bit, error-free word.

The processing by CRC check circuit 14 consists of temporarily hard-quantizing the soft bit values in the accumulators to either −1 or +1 (Boolean 1 or 0) and then calculating a syndrome, which is the remainder upon polynomial division of the word by a CRC polynomial according to known art. A syndrome of all zeros signifies an error-free word, one of a predetermined forty non-zero syndrome values corresponding to one of the possible predetermined single-bit error patterns, and all other syndrome values correspond to more than a single-bit error. By checking a non-zero syndrome with each of the 40 possible syndromes that would result in a single-bit error in one of the 28 data bits or 12 CRC bit positions, it can be determined if such a single-bit error has occurred and where it is located. It my then be corrected by inverting the bit in question. Alternatively, any other non-zero syndrome can be taken to mean that the data bits cannot be relied upon. Whether or not the device employs a single-bit error correction capability of the CRC code to correct an error is not critical to the implementation of the present invention. It is more important to simply identify that a word contains an uncorrected error.

Upon detection of an error-free word, or a word in which a single-bit error has been corrected by the above-described procedure, an indication from the CRC check circuit is provided to a power down timer 16 which can save power by commanding parts of the receiver 10, Manchester code demodulator 11, sync detector 12, cumulative majority vote circuit 13, CRC check circuit 14 and MIN detector 15, to ignore the rest of the transmission cycle, irrespective of the MIN or message type. The CRC check aim activates a message processor 18 to check if the type of message is a calling message, a broadcast message or a dummy (filler) message. If the message processor 18 determines that the message is a calling message, it activates a MIN detector 15 to check if the word contains at least part of the MIN of the receiving phone.

If the received MIN bits do not match corresponding bits of the MIN of the receiving phone, the MIN detector generates a "not MIN" indication, which is provided to the power down timer 16 along with the message type information from message processor 18 (i.e. „single or double word message) to enable it to compute how long the receiver may be powered down before the next message is expected to begin. The power down timer 16 will then produce control signals to the receiver and processing circuits 10, 11, 12, 13, 14, 15 and 17 to reduce their power consumption until the start of the next message cycle that may contain the phone's MIN. This may be of two 463-bit cycles later as when the MIN of another phone is transmitted in a first cycle and the message is a multiple word message. In this case it is known that at least the second cycle will also be addressed to the other mobile phone in order to complete the calling message. The first time a new message my be addressed to the mobile phone in question is thus, in this case, two cycles later.

Two cycles later, the word received may be a further continuation word of the previous message, as indicated by the continuation flag bits, in which case it can be ignored until receipt of the next word, whereupon a further check for continuation of the old message or commencement of a new message is made by the message processor 18.

If no CRC is indicated after processing the first word repeat and adding its 40-bit values into the majority vote circuits 13, the majority vote circuits receive the 40-bit values of the next word repeat and add them to the corresponding values from the first repeat still in the accumulators. Thus, the majority vote circuits 13 at the end of the second repeat (A2 or B2) contain the sums of the corresponding bit values of the first and second word repeats. When the soft bit values are used as described above, the resulting 40 values represent the 40-bit word with a higher confidence of correctness than either repeat alone. If hard bit values are accumulated instead, the resulting values do not necessarily have a higher probability of giving a correct word, but at least have an independent chance of being correct. Thus, the cumulative probability of a word being detected error free after both the first and the second repeats is higher than the probability of detecting it on the first repeat alone. Consequently, upon processing the second word-repeat using accumulation of either hard or soft bit values, the CRC check circuit 14 is again activated. As before, if the CRC is errorfree, a power down for the rest of the base station transmit cycle may be instigated irrespective of the of the MIN or message type.

However, taking account of the MIN and the message type can give additional power savings. Consequently, the MIN detector 15 is activated and if the MIN is found not to match that of the receiving phone, the power down timer 16 is activated for a longer period.

If the CRC check does not indicate an error free message, the third message repeat becomes cumulatively added in the majority vote circuits 13 and so on until either the CRC checks at some stage, or all five message repeats have been exhausted. In the latter case, the sync detector 12 is reenabled to search for dotting sequences D or sync words S for the next cycle to be processed. According to the invention, a message is CRC checked using cumulatively increasing amounts of bit-wise majority vote decoding until finally the full five-fold majority vote is employed if CRC did not check at an earlier stage.

This is in contrast to the disclosure of the European patent application to Harte cited above in which the message repeats are decoded individually without the use of bit-wise majority voting, and also contrasts with other prior art decoders that use only five-fold majority vote decoding and not the lower orders of majority vote that are transiently employed in the present cumulative majority vote procedure. The cumulative majority vote procedure of the present invention results in a higher probability of correct reception in the case of a message addressed to the receiving phone than the prior art common methods, and thus results in a lower mean standby power consumption than the device disclosed in the European patent application to Harte.

Additionally, the present invention enters the power down mode principally contingent upon the CRC check being successful, whereas the aforesaid European patent is exclusively based on evaluating the MIN.

Figure 6:
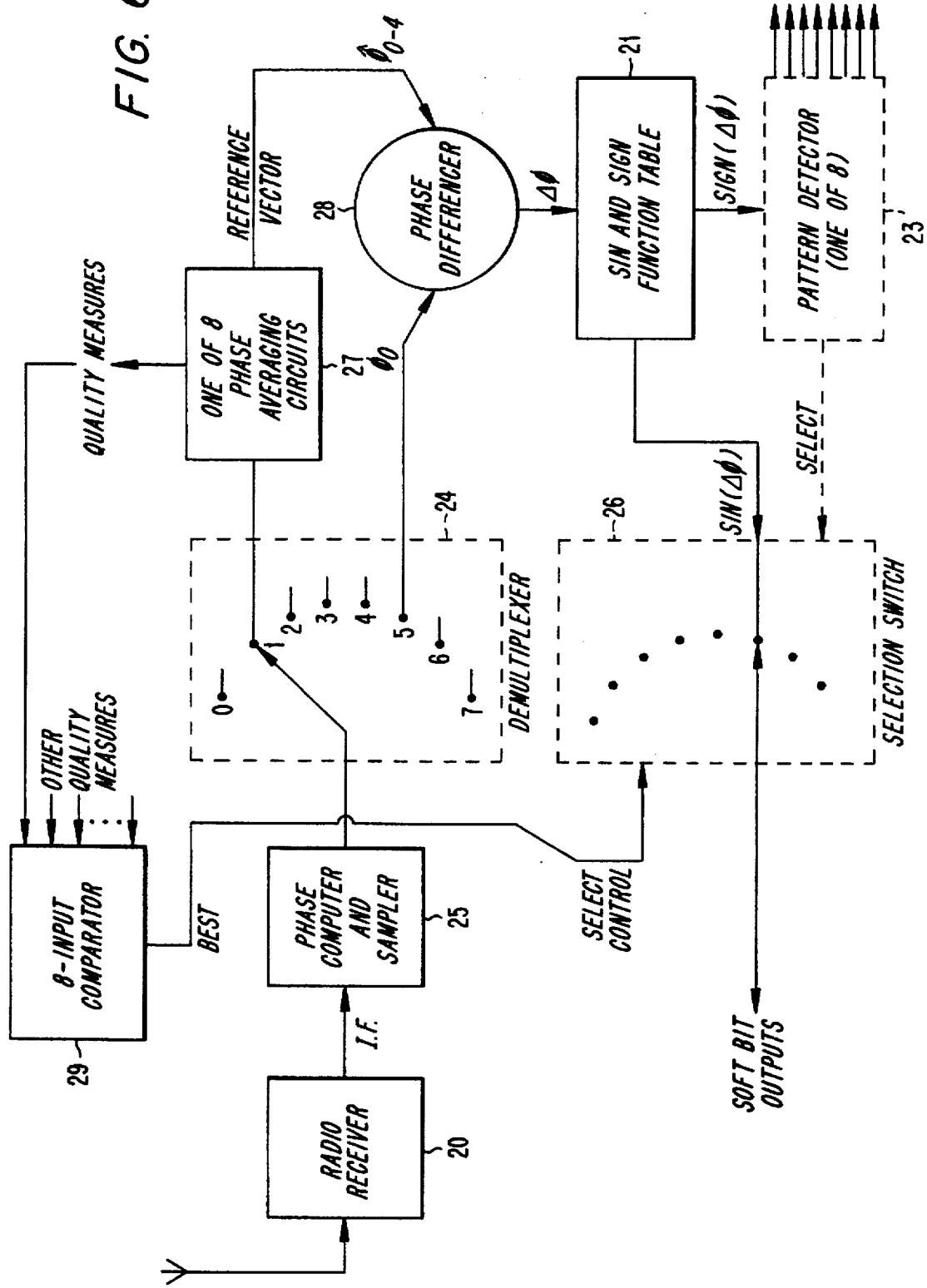
FIG. 6 is a block diagram of a suitable Manchester Code Modem in accordance with the present invention.

FIG. 6 provides more detail of a suitable Manchester code modem. To obtain soft bit values from the modem for use in soft majority votes, a sine and sign function table 21 has been added. This modem operates as follows. Manchester code FM has a property, due to the frequency being modulated equally low and high in each symbol period, that the radio signal phase returns to more or less the same position at the end of each symbol. This phase is moreover midway between the expected phase excursions in the center of a symbol for "1" or "0" respectively, and is therefore suitable as a comparator reference for deciding between 1's and 0's. However, timing for the beginning and the middle of symbols must also be identified. This is the bit-sync problem that all digital communications systems must solve. In the present invention, it is solved in the modem of FIG. 6 by sampling a receiver 20 output by a phase computer and sampler 25 at a rate of 8 samples per Manchester code symbol, and sorting every eighth sample by means of a demultiplexer 24 to give an 8-candidate stream for processing.

The processing consists of evaluating these streams as candidates for end-of-symbol samples and as mid-bit samples. To evaluate a stream for an end-of-sample candidate, the average phase is calculated by a phase averaging circuit 27. Therefore, eight phase averagers 27, one for each stream, are provided for calculating a reference phase Phi(i) under the assumption that the sample phase represents the end of a symbol. Each of the phase averagers 27 can be a digital phase lock loop which evaluates a frequency error as well as phase. Each stream is also evaluated as a mid-bit sample stream by comparing in a phase differentiator 28 the phase sample Phi(i) with a phase reference calculated from the corresponding end-of-bit sample stream. If (i) is a mid-bit-sample, then (i–4) must be an end-of-bit sample, therefore Phi(i) is compared with the reference phase Phi(i–4). This is done in whole sample timings, that is:

Phi(7) is compared with reference Phi(3),
Phi(6) is compared with reference Phi(2),
Phi(5) is compared with reference Phi(1),
Phi(4) is compared with reference Phi(0),
Phi(3) is compared with reference Phi(7),
Phi(2) is compared with reference Phi(6),
Phi(1) is compared with reference Phi(5),
and Phi(0) is compared with reference Phi(4).

In each case, the phase difference obtained is deemed to represent a demodulated "1" if between 0 and +180 degrees, and a "0" if between 0 and −180 degrees. These hard decisions are made by a SIGN function block 21 and are fed to the eight pattern detectors 23. Each of the eight pattern detectors 23 receives the output of a corresponding one of the eight phase differentiator 28 and operates according to the above-described procedure for detecting dotting sequences D and sync words S. When the dotting sequence D and sync words S are detected on any sample timing within an expected window, the selection switch 26 is made to select that sample timing for outputting soft bit values.

The soft bit values are calculated by a look-up table 21 to be the SINE of the phase differences, which can be shown to be an optimum nonlinear weighting for use in soft majority vote combination of phase differences. The use of SINE or COSINE of a phase difference as soft bit values for soft decoding is disclosed in, e.g., U.S. Pat. No. 5,475,705 to Dent entitled "Demodulator for Manchester Coded FM signals" and issued Dec. 12, 1995.

The selection switch 26 can remain at the set position at least for the duration of the relatively short message cycle length (463 bits) that are needed before resynchronization in the present invention. For longer intervals between synchronisation, however, or in certain circumstances such as high values of time dispersion in the propagation path, it can be advantageous to permit the selector switch 26 to adapt to perceived changes in optimum sample timing, by, for example, continuously monitoring the quality measure produced by the phase reference averaging circuits 27 and picking the sample timing that gives the best quality using an 8-input comparator 29 in order to determine the selector switch position.

It should be noted that the pattern detectors 23 in FIG. 6 correspond to the dotting sequence and sync word detector 12 in FIG. 5. The selected soft bit value stream is fed from the radio receiver/demodulator 20 of FIG. 6 to the cumulative majority vote circuits 13 of FIG. 5.

The modem of FIG. 6 operates on phase values of the radio signal and does not take note of instantaneous amplitude values of the radio signal. An improved performance may be obtained by processing both amplitude and phase of the radio signal. These may be conveniently derived from the radio signal LOGPOLAR form according to the principle disclosed in U.S. Pat. No. 5,048,059. The logpolar technique is a means of amplifying and digitizing the full vector form of a radio signal without the inconvenience of first having to establish the automatic gala control value. The complex vector is yielded in polar form as the logarithm of the vector radius and the phase of a vector angle. This my be converted into Cartesian X+jY form by use of the sine/cosine and antilog look-up tables in a digital signal processor. In this case, the phase avengers 27 in FIG. 6 are replaced by Straight vector avengers that avenge the real and imaginary parts of the complex vector Zi to produce reference vector Z(i). Demodulation of a sample timing Z(i) with respect to a reference Z(i−4) then takes place by calculating the product $$Z(i)Z^*(i-4)$$

where * signifies complex conjugate, and then taking the imaginary part. In this case, the result is directly in a suitable soft-value form for subsequent majority vote accumulation and does not need to be subject to the sine transformation function 21, as discussed above. The benefit of this form of demodulation is that bits or message repeats that are subject to fading, which reduces the amplitude of the radio signal, will be deweighted in the majority vote accumulation process compared to bits received at high signal levels and which therefore are more trustworthy.

It will be appreciated that the above signal processing operations may be carried out using a suitable programmable digital signal processor (DSP) and/or computer loaded with suitable programs. Such a device can implement the Manchester code modem, sync detection, cumulative majority vote and CRC check as well as the message processing. A preferred embodiment uses a DSP to implement the Manchester code modem, sync detection and cumulative majority vote circuits, the results after each stage of majority voting being passed to a microprocessor that performs the CRC check and message handling. The microprocessor preferably operates according to the flow chart of FIG. 7.

Figure 7:
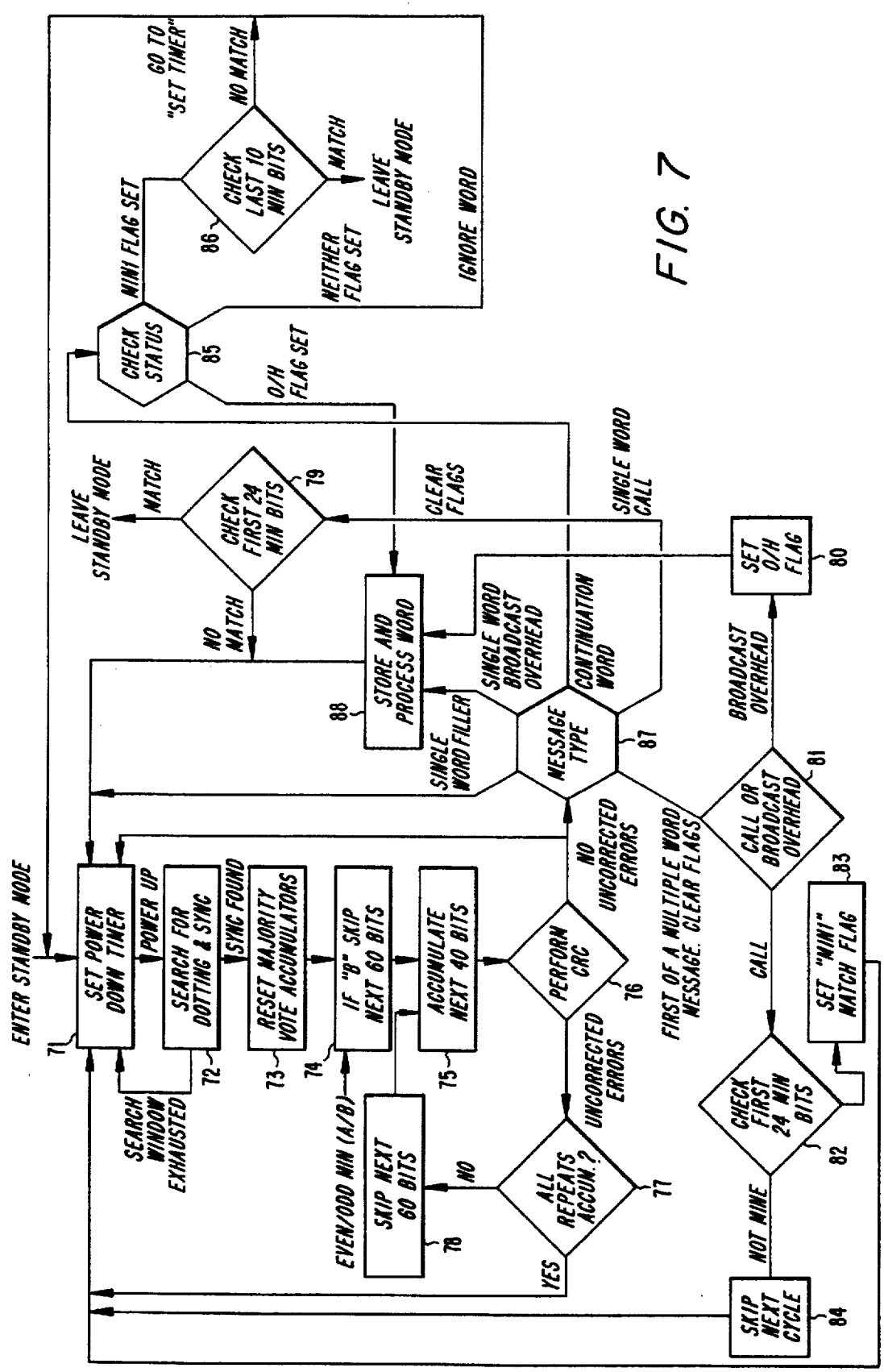
FIG. 7 is a flow chart in accordance with the present invention.

FIG. 7 shows entry to the standby mode upon switch-on of the mobile phone or termination of a previous call. In step 71, a central timer is set to power up the receiver in a certain window to search for dotting D and sync S words, indicated by step 72. The window begins at a fixed time before the next sync is expected and ends a fixed time afterward, for example, ± one symbol. The receiver should be powered down as long as possible, but not so long that there is a risk of losing the word sync. It is a matter of adjusting the receiver to listen to the right carrier frequency and stabilizing the reference phases in the Manchester code demultiplexer.

If dotting D and sync S words are not detected, then the process returns to step 71 where the power down timer is reset. Upon detecting dotting D and sync words S, the cumulative majority vote process is initiated at step 73 and continues at steps 74–78 until either CRC checks or all repeats have been received. At step 73, the majority vote accumulators are reset. The process proceeds to step 74 where it is determined which type of message A or B is to be received and skipping the bits corresponding to the other channel. The next set of relevant bits are accumulated at step 75, and a CRC check is performed at step 76. If all repeats have not been accumulated and there are uncorrected errors after the CRC check, the process skips the next set of bits (which belong to the different type of message) at step 78 and proceeds to accumulate the next set of relevant bits at step 75. In the case where all repeats have been accumulated as decided at step 77 and the accumulated repeats still contain uncorrected errors, the power down timer is reset at step 71 to start a sync search again with almost no delay.

In the case of a CRC check indicating an error free word prior to or after processing all five repeats, the nature of the message must be checked at step 87 to determine for how long the power down timer shall operate. Note that the power down timer is activated upon CRC check regardless of the message type. The types of messages are:

1) A one-word call,
2) A multiple-word call,
3) A one-word filler,
4) A one-word broadcast/overhead message, or
5) A multiple-word broadcast.

Two bits of the message are used to distinguish between single-word messages, the first word of a multiple-word message and a continuation word of a multiple-word message. After testing the message type, the mobile phone either ignores the rest of the transmit cycle by powering down till the next syncs are due, or ignores the rest of the cycle and the whole of the next cycle, or quits the standby mode because a one- or two-word call has been detected to contain the phone's MIN bits. Specifically, if the message is a single word filler, the routine returns to step 71 to set the power down timer. If the message is a single word broadcast overhead message, the word is stored and processed at step 88 and thereafter the subroutine returns to step 71.

If the message is determined to be a single word call at step 87, then the flags are cleared and the first 24 bits are checked for match with the mobile phone's MIN at step 79. If there is a match, then the mobile phone leaves the stand-by mode. If the 24 bits do not match, then the routine returns to step 71.

If the message is determined to be the first of a multiple word message at step 87, the flags are cleared and it is determined whether the multiple word message is a call or a broadcast overhead message at step 81. If the call is a broadcast overhead message, then the O/H flag is set at step 80, the word is stored and processed at step 88 and the routine returns to step 71. If a call message, the first 24 MIN bits are checked at step 82. If the first 24 bits match the mobile phone's MIN, then a flag MIN1 is set, and the routine returns to step 71. If the 24 bits do not match the mobile phone's MIN, then the next cycle is skipped at step 84 and the routine returns to step 71.

If the message is determined to be a continuation word at step 87, then the routine proceeds to step 85 to check the status of flags. At step 85, if an overhead flag O/H is set (in step 80 described above), then the program proceeds to step 88 where the continuation word broadcast overhead message is stored and processed. If a MIN1 flag is set (at step 83 described above), then the last 10 MIN bits are checked. If the last 10 MIN bits match the mobile phones MIN, the mobile phone leaves the stand-by mode. If it does not match, then the routine returns to step 71 where the power down timer is set. If, upon checking the flag status at step 85, it is determined no flag is set, then the routine returns to step 71 where the power down timer is set.

Since the time period between receipt of an error free (or error correctable) word and the next window varies according to which repeat is correctly received, it is necessary to calculate this time period, such as done in EP 0 473 465. The microprocessor calculates the sleep time set in the timer based on information from the DSP. This information includes which repeat was decoded. (The DSP knows how much time has elapsed since the sync word.) The microprocessor knows how much time it used to check the bitstream from the DSP and makes the decision to power down for a calculated period of time.

Figure 8:
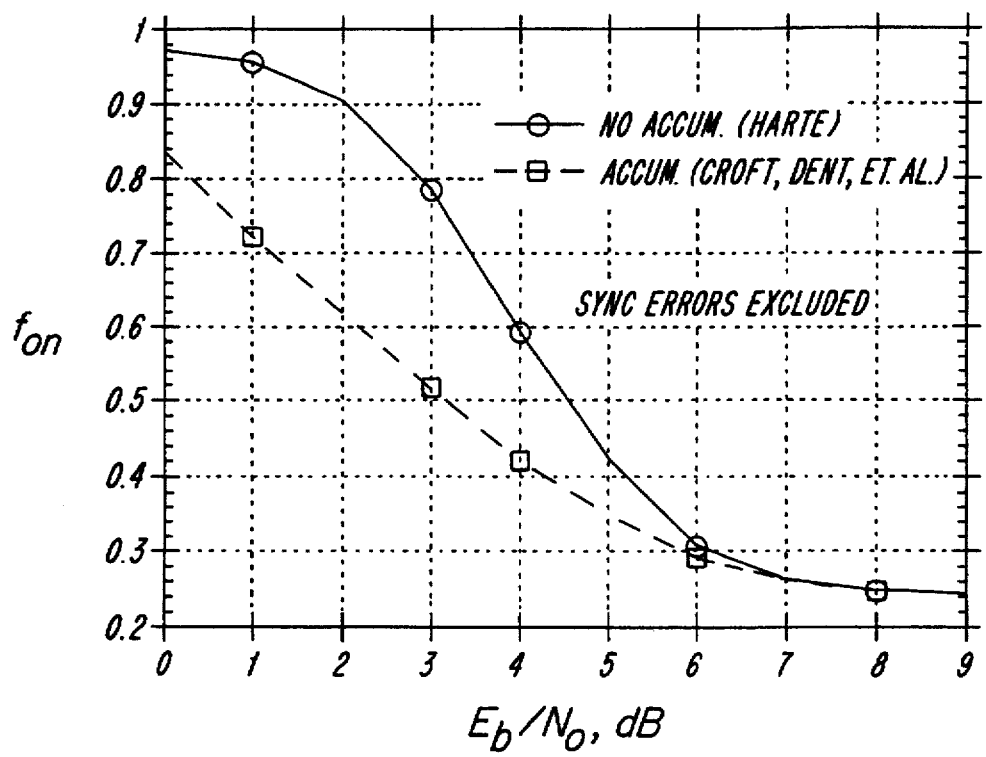
FIG. 8 is a graph relating percentage power savings to signal-to-noise ratio in accordance with the present invention.
Figure 9:
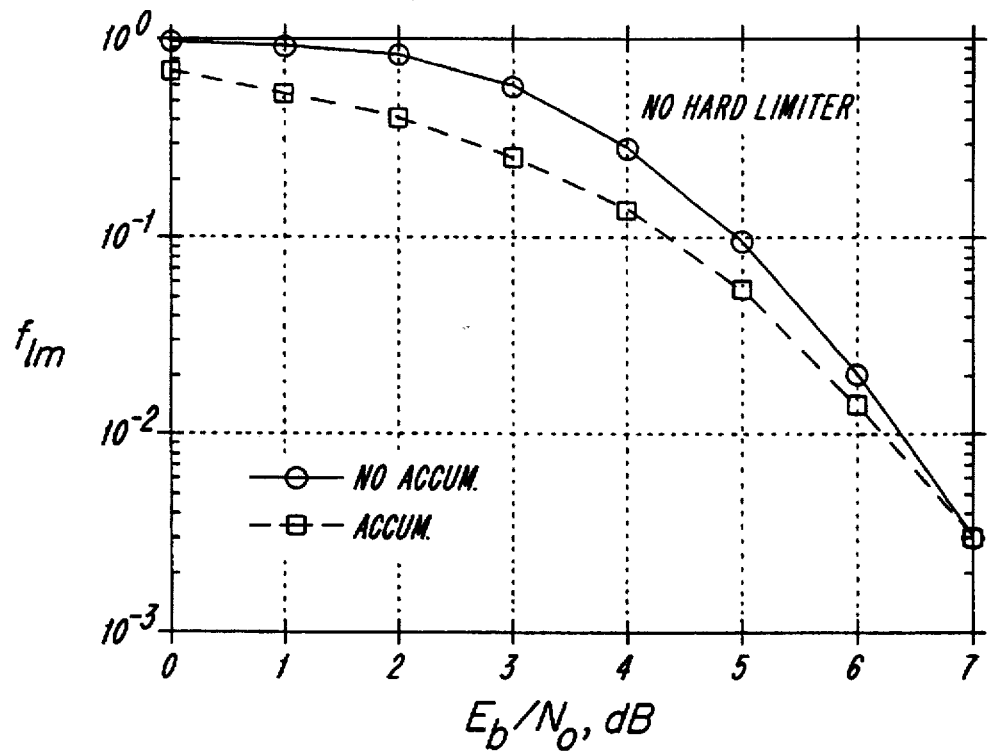
FIG. 9 is a graph calculated for the invention disclosed in U.S. patent application Ser. No. 572,409.

Using the above-described invention, the performance has been determined in terms of the mean percentage of time that the receiver is active while the phone is locked to a calling channel, versus the signal-to-noise ratio. At a high signal-to-noise ratio, there is a higher probability of correctly receiving a first word-repeat and thus terminating processing earliest to save maximum power. As the signal-to-noise ratio is reduced, more word-repeats on average have to be accumulated in the majority vote process to correctly decode the word, so the power savings are less. The graph of FIG. 8 relates percentage power savings to signal-to-noise ratio for this invention ("Accum.") as compared to a device in accordance with Harte ("No Accum."). This is for the pessimistic case that all messages are single-word calls. If all messages are two-word calls to other phones, a further power savings of at least a factor of two could be obtained. This compares with the graph of FIG. 9 calculated for the invention disclosed in U.S. patent application Ser. No. 572,409, even when using the same inventive demodulator described in U.S. Pat. No. 5,475,705 cited above, and other assumptions being equal. FIG. 9 is a comparison of the lost message probability for the two algorithms with the sync considerations removed. A lost message occurs if no CRC check is successful, even after all five repeats have been checked.

Similar curves may be drawn to compare the probabilities of correctly receiving an intended message for the present invention and that of U.S. patent application Ser. No. 572,409, showing that an objective of the present invention (to increase correct message decoding probability at the same time as effecting a greater power savings compared to prior art inventions) has been achieved.

Although the above described invention has been described in connection with cellular telephones, it is not intended to be so limited. The power conserving arrangement and method of this invention can be used advantageously with beepers, pagers, and any other system having mobile stations which are serf-identifiable upon receipt of transmitted messages. Further modifications and improvements which retain the basic underlying principles disclosed and claimed herein are within the scope and spirit of the present invention.

What is claimed is:

1. A mobile station having improved battery life in standby mode comprising:

a receiver for sequentially receiving repeated finite length data messages transmitted as radio signals from a base station;

a data demodulator for processing said received signals to generate data values;

a decoder to decode said data values to generate data bits and to produce an indication of correct or incorrect decoding based on cumulative majority voting on each of said data values; and a power-down timer for reducing the power consumption of any of the above components for a determined time after receiving said indication of correct decoding from said decoder.

2. A mobile station according to claim 1, wherein said determined time for power-down is until the beginning of the next message.

3. A mobile station according to claim 1, further comprising:

a comparator for determining if said data bits contain a match with a part of said mobile station's telephone number to produce a match or mismatch indication.

4. A portable radio system having improved battery life in standby mode comprising:

a receiver for sequentially receiving repeated finite length dam messages transmitted as Manchester-coded and frequency-modulated radio signals from a base station;

a Manchester code demodulator for processing said received signals to demodulate said Manchester-coded FM and producing corresponding data bit values;

a sync detector for processing said bit values to detect a predetermined data bit pattern signifying the beginning of a finite length message and producing a reset signal;

a timing control unit for counting demodulated Manchester code symbols that is reset upon receipt of said reset signal;

a decoder for further processing said bit values to determine a message and produce an indication if said message has been received error-free; and a power-down timer for reducing the power consumption of any of the above for a determined time after receiving an indication of error-free reception from said decoder.

5. A portable radio system according to claim 4, further comprising:

a comparator activated upon receipt of an indication of correct message reconstruction from said dad for determining if said message contains any part of said portable radio system's identification number and producing a corresponding match or mismatch indication; and a controller for varying said determined time of power-down in dependence on said match or mismatch indication.

6. A portable radio system having improved battery life in standby mode comprising:

a receiver for sequentially receiving repeated finite length data messages transmitted as Manchester-coded and frequency-modulated radio signals from a base station;

a Manchester code demodulator for processing said received signals to demodulate said Manchester-coded FM and producing corresponding data bit values;

a sync detector for processing said bit values to detect a predetermined data bit pattern signifying the beginning of a finite length message and producing a reset signal;

a timing control unit for counting demodulated Manchester code symbols that is reset upon receipt of said reset signal;

a decoder for further processing said bit values to determine a message and produce an indication if said message has been received error-free; and a power-down timer for reducing the power consumption of any of the above for a determined time after receiving an indication of error-free reception from said decoder;

a number of accumulators corresponding to the number of data bits in each message repeat, said accumulators being reset by said reset signal; and a majority-vote circuit for selecting corresponding data bit values demodulated from said message repeats and accumulating said selected data bit values in corresponding accumulators.

7. In a radio communication system having at least one base station serving one or more mobile stations, the base station transmitting to the mobile stations a message signal comprising repeated blocks of information bits, each block including a number of data bits and a number of check bits whose value depends on said data bits, a method for conserving battery power in at least one mobile station comprising the steps of:

receiving at the mobile station said message signal;

decoding at the mobile station each repeated block of information bits contained in said message signal and generating a positive indication when said check bits are consistent with said data bits;

de-energizing selected circuits within said mobile station as soon as at least one decoded repeated block results in said positive indication; and re-energizing said selected circuits such that the mobile station is prepared to receive the next message signal.

8. The method according to claim 7 in which the check bits are cyclical redundancy bits.

9. The method according to claim 8 in which the positive indication is a positive cyclical redundancy check.

10. In a radio communication system having at least one base station serving one or more mobile stations, the base station transmitting to the mobile stations a message signal comprising repeated blocks of information bits, each block including a number of data bits and a number of check bits whose value depends on said dam bits, at least one mobile station comprising:

means for receiving at the mobile station said message signal;

means for decoding at the mobile station each repeated block of information bits contained in said message signal and generating a positive indication when said check bits are consistent with said data bits;

means for de-energizing selected circuits within said mobile station as soon as at least one decoded repeated block results in said positive indication; and means for re-energizing said selected circuits such that the mobile station is prepared to receive the next message signal.

11. The method according to claim 10 in which the check bits are cyclical redundancy bits.

12. The method according to claim 11 in which the positive indication is a positive cyclical redundancy check.

* * * * *